No. 839,587. PATENTED DEC. 25, 1906.
F. HERRMANN.
CONVEYING DEVICE FOR ALL KINDS OF UNBURNT BRICKS PRODUCED IN THE MOLDING PRESS.
APPLICATION FILED SEPT. 4, 1906.
5 SHEETS—SHEET 1.
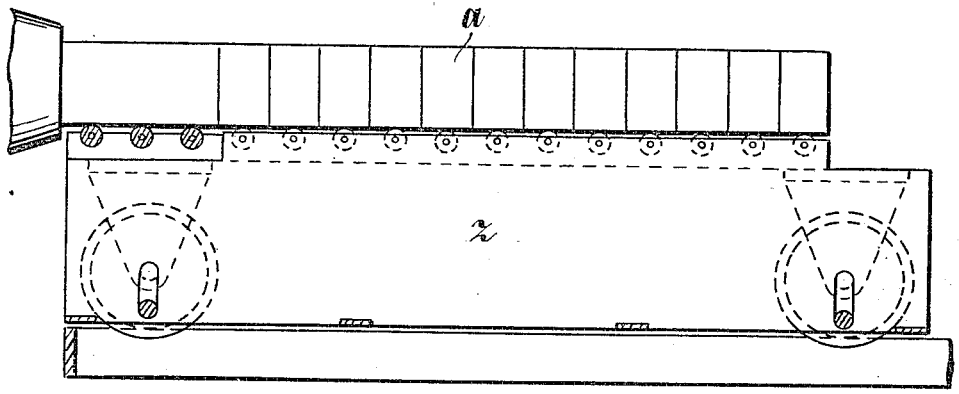
FIG-1-
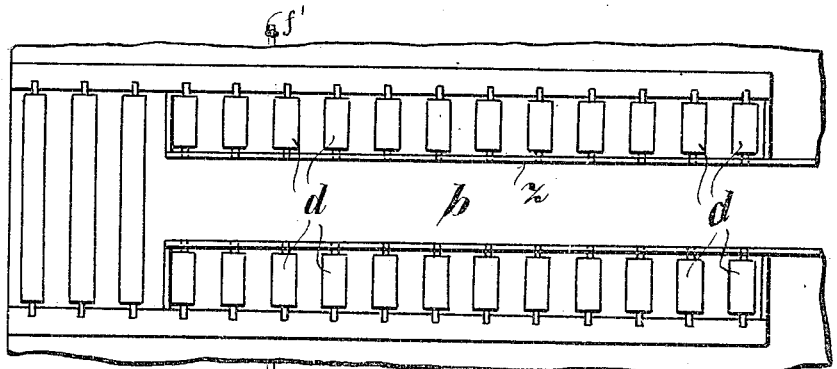
FIG-2-
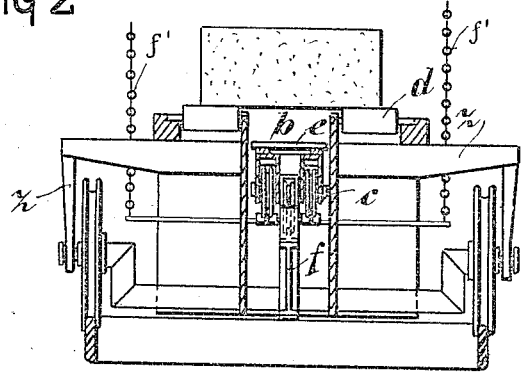
FIG-4-

No. 839,587. PATENTED DEC. 25, 1906.
F. HERRMANN.
CONVEYING DEVICE FOR ALL KINDS OF UNBURNT BRICKS PRODUCED
IN THE MOLDING PRESS.
APPLICATION FILED SEPT. 4, 1906.
5 SHEETS—SHEET 2.
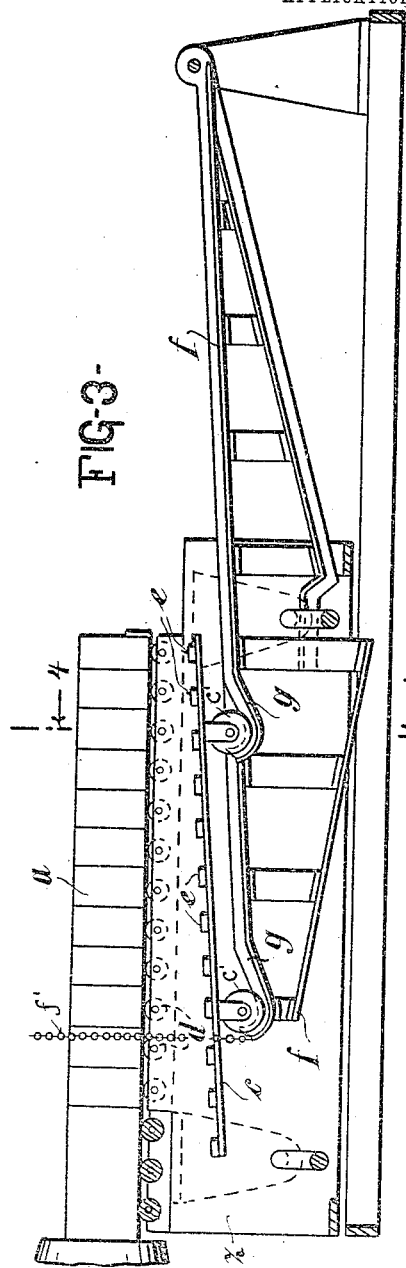
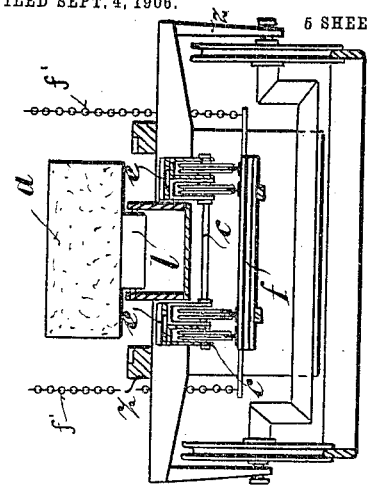
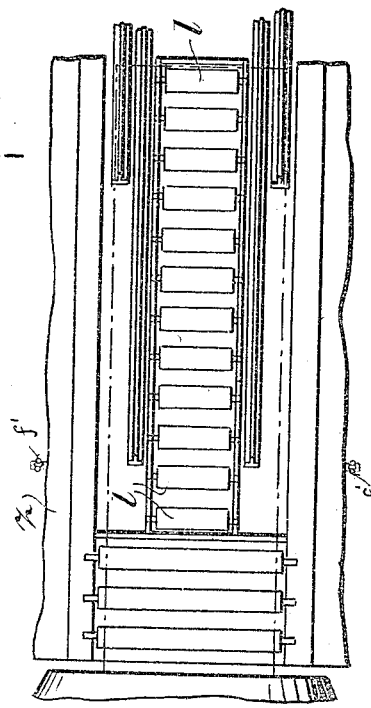
Witnesses
Inventor
Friedrich Herrmann No. 839,587. PATENTED DEC. 25, 1906.
F. HERRMANN.
CONVEYING DEVICE FOR ALL KINDS OF UNBURNT BRICKS PRODUCED
IN THE MOLDING PRESS.
APPLICATION FILED SEPT. 4, 1906.
5 SHEETS—SHEET 3.
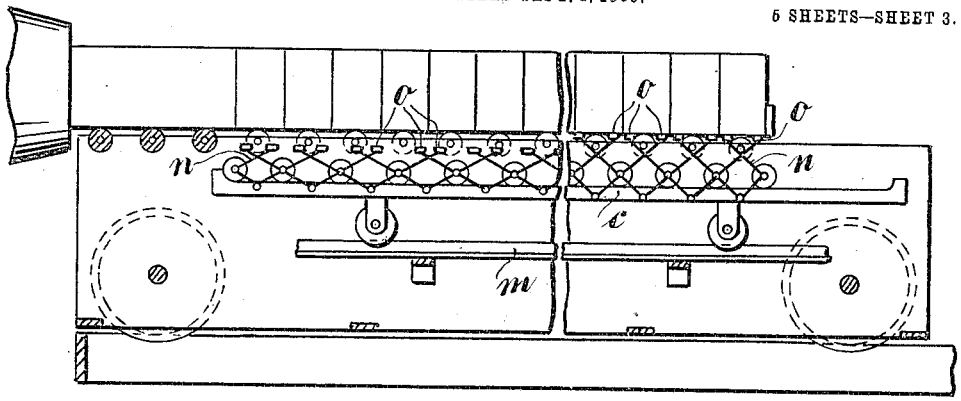
FIG-7-
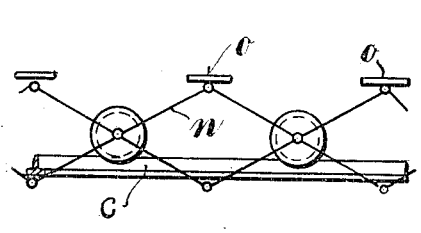
FIG-8-
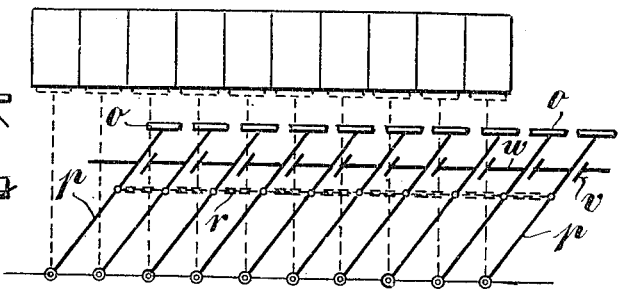
FIG-10-
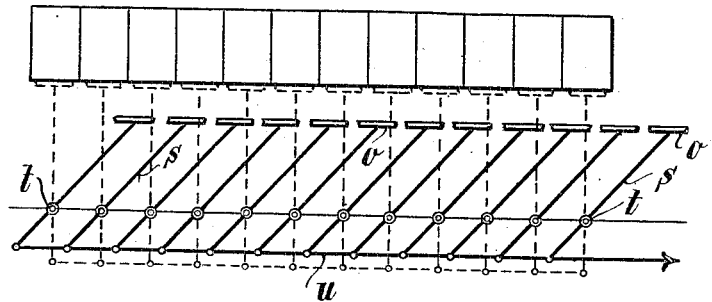
FIG-9-
Witnesses
Inventor No. 839,587. PATENTED DEC. 25, 1906.
F. HERRMANN.
CONVEYING DEVICE FOR ALL KINDS OF UNBURNT BRICKS PRODUCED
IN THE MOLDING PRESS.
APPLICATION FILED SEPT. 4, 1906.
5 SHEETS—SHEET 4.
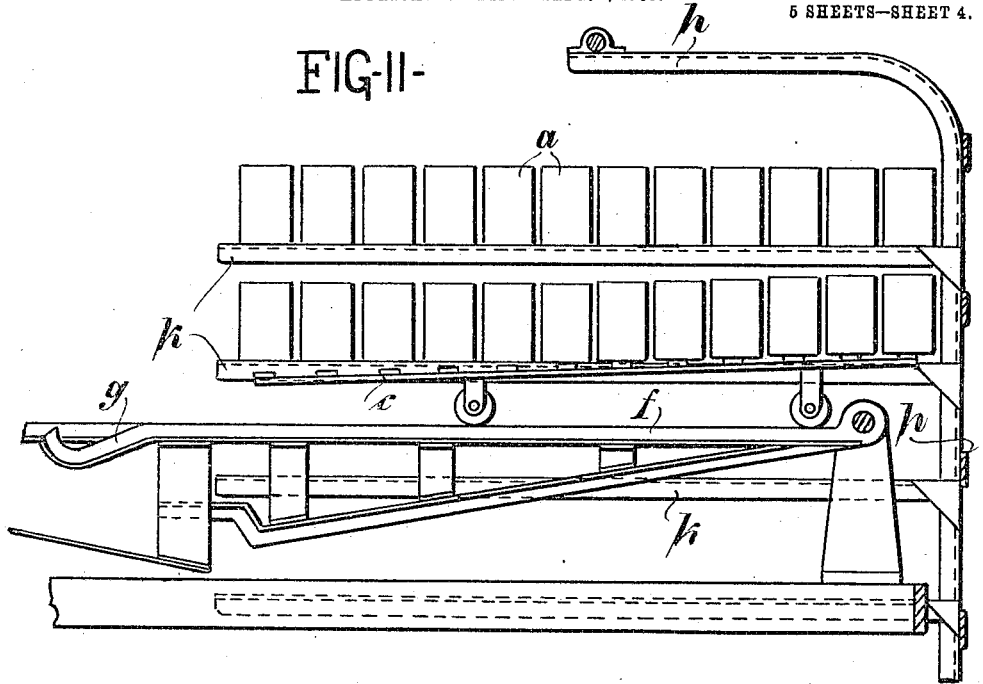
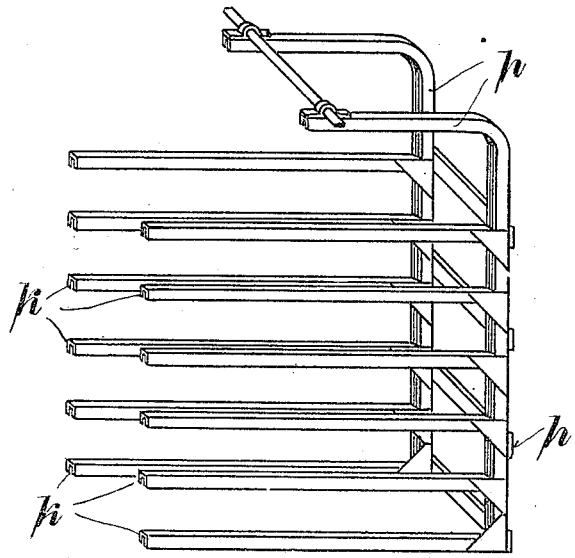
Witnesses
Inventor No. 839,587. PATENTED DEC. 25, 1906.
F. HERRMANN.
CONVEYING DEVICE FOR ALL KINDS OF UNBURNT BRICKS PRODUCED
IN THE MOLDING PRESS.
APPLICATION FILED SEPT. 4, 1906.
5 SHEETS—SHEET 5.
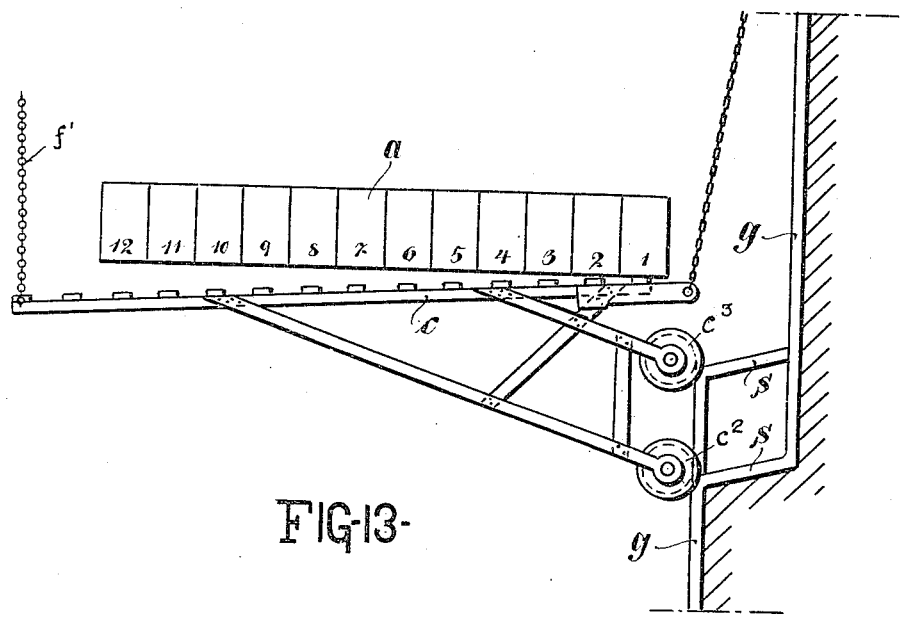
FIG-13-
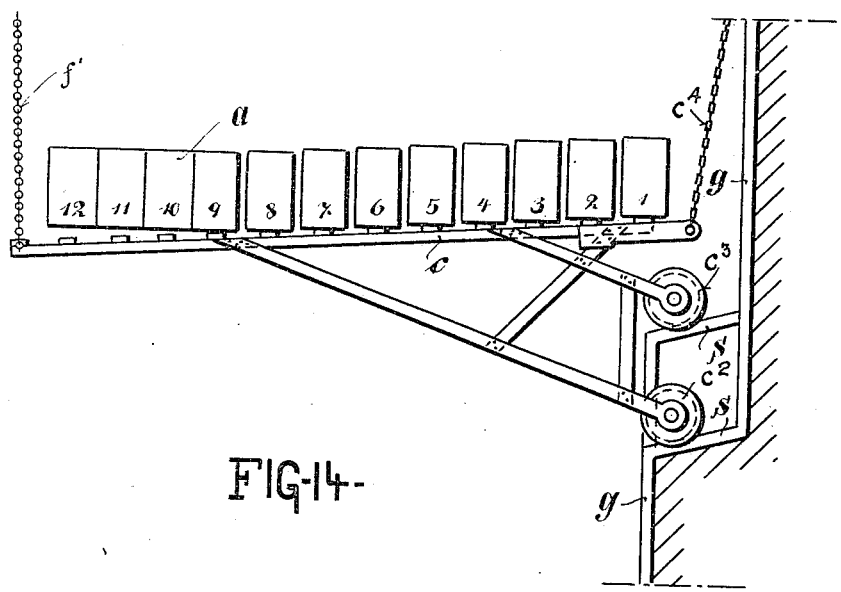
FIG-14-
Witnesses
Inventor

UNITED STATES PATENT OFFICE.

FRIEDRICH HERRMANN, OF GLATZ, GERMANY.

CONVEYING DEVICE FOR ALL KINDS OF UNBURNT BRICKS PRODUCED IN THE MOLDING-PRESS.

No. 839,587.        Specification of Letters Patent.        Patented Dec. 25, 1906.

Application filed September 4, 1906. Serial No. 333,128.

*To all whom it may concern:*

Be it known that I, FRIEDRICH HERRMANN, a subject of the German Emperor, residing at Glatz, Silesia, Germany, have invented certain new and useful Improvements in Conveying Devices for all Kinds of Unburnt Bricks Produced in the Molding-Press; and I do hereby declare the following to be a full, clear, and exact description of the invention, such as will enable others skilled in the art to which it appertains to make and use the same.

This invention relates to a conveying device for all kinds of unburnt bricks and tiles produced in the molding-press in which a take-off carriage automatically removes the bricks from the cutting-table.

The conveying device may be arranged in or under the cutting-table and so arranged that by altering the height of its bearing-surface the unburnt bricks previously cut off from the stream of clay are removed and separated or spaced apart.

In the accompanying drawings, Figure 1 represents a side elevation of the cutting-table and conveyer. Fig. 2 represents a plan of the uncovered cutting-table. Fig. 3 represents a side elevation, partly in section, of a cutting-table, showing one embodiment of this invention used in connection therewith. Fig. 4 represents a transverse section thereof, taken on line 4 4 of Fig. 3. Fig. 5 represents a plan view of another form of the invention. Fig. 6 represents a transverse section of the form shown in Fig. 5. Fig. 7 represents a side elevation of a cutting-table with another embodiment of the invention applied. Fig. 8 represents an enlarged detail of the form of conveyer shown in Fig. 7. Fig. 9 represents a side elevation of another form of conveyer. Fig. 10 represents still another embodiment of the conveyer. Fig. 11 represents a side elevation of the conveyer shown in Figs. 1 to 4 in connection with a loading or charging frame. Fig. 12 represents a perspective view of the charging-frame, and Figs. 13 and 14 represent side elevations of another form of conveyer in different positions.

In the form of invention illustrated in Figs. 1 to 4 the stream of clay $a$ is shown on the cutting-table $z$ divided into separate bricks. The cutting-table $z$ is provided in the middle of the slide-surface thereof with a wide opening or gap $b$, (see Fig. 2,) in which the specially-constructed conveyer device $c$ (shown in Figs. 3 and 4) moves. The slide-surface is preferably formed of rollers $d$; but it may be of any other suitable construction.

The take-off carriage or conveyer $c$ is somewhat narrower than the gap $b$ and consists, preferably, of a rectangular frame supported on wheels $c'$ and provided with transverse connecting-pieces $e'$, which form a support or bearing-surface for the bricks. The take-off carriage $c$ travels on rails $g$ of a vertically-movable guide-frame $f$, which is pivoted at its outer end and adjustably supported by chains $f'$ at its free end. The rails have spaced depressions $g'$, with their outer walls inclined slightly and into which depressions the wheels $c'$ of the carriage $c$ drop and by means of which the carriage is prevented from running off the inner rail ends.

After the bricks have been cut on the cutting-table $z$ the guide-frame $f$ for the take-off carriage $c$ is lowered by means of the chain $f'$, and the conveyer-carriage $c$ then runs down the inclined rails $g$ in the gap $b$ in the cutting-table under the cut bricks, as shown in Fig. 3. The guide-frame $f$ is then raised until the outer end of the take-off carriage $c$ comes into contact with the outermost brick and is held in this position by the chain $f'$. The take-off carriage $c$ is then moved outwardly by any suitable means up the inclined track $g$, and the surface of the carriage is gradually raised in consequence of the obliquity of the rails on which it runs. This raising of the carriage causes the cut bricks to be gradually removed from the cutting-table and a space formed between the bricks, the width of which depends on the length and inclination of the side rails. If, for example, twelve bricks of seven centimeters width are to be removed and an intermediate space of one centimeter between each pair of bricks is to be created, the oblique bearing-surface of the carriage must be $12 \times 7 + 1 - 21 = 95$.

The extent of the inclination should allow of three centimeters for each brick. When the take-off carriage has passed over the oblique ascents of this track, it will have gradually taken up all the bricks and moved outward into the position shown in Fig. 11 into a charging-frame $h$, onto which the bricks will be moved without their being touched by hand, the arms $k$ of the frame $h$ engaging the ends of the bricks, which project beyond the carriage $c$.

In the form shown in Figs. 5 and 6 instead of the take-off carriage $c$ working in the interior of the cutting-table $z$ the arrangement is such that the bricks are supported on the middle part of the cutting-table by means of one or more roller-tracks $l$, and the take-off carriage $c$ may be bifurcated in order that the cut bricks may be engaged at their outer ends thereby and be spaced apart, as shown in Figs. 5 and 6. In this form of the invention the take-off carriage $c$ in addition to the upward movements necessary for removing and separating the bricks has a horizontal movement, and the take-off carriage is introduced into the cutting-table $z$ from the side.

In the form of the invention illustrated in Figs. 13 and 14 the conveyer $c$ is similar to the form shown in Figs. 1 to 4 and in addition to the movements necessary for removing and separating the bricks also moves in a vertical or an oblique direction to adapt it for use when the cutting-table $z$ is pushed in a horizontal or an ascending direction over the conveyer $c$, so that the latter is arranged inside the cutting-table $z$. The conveyer $c$ has a bearing-surface furnished with stepped supports for the bricks and runs on vertically-spaced rollers $c^2$ and $c^3$. A three or four rail track $g$ is vertically fixed to woodwork or masonry $g^2$ and is furnished with oblique ascents $s\,s$, similar to the construction shown in Figs. 1 to 4. The bricks 1 to 12 are shown in Fig. 13 disposed horizontally as they are carried by the cutting-carriage. When brick No. 1 comes in contact with the oblique bearing-surface of the conveyer $c$, said conveyer is raised above the oblique ascents $s\,s$ and is loaded, as shown in Fig. 14.

In the form shown in Fig. 7 a lever device or lazy-tongs may be employed, in which case no alteration of the cutting-table is necessary. The take-off carriage $c$ runs horizontally of the rails $m$, which are firmly fixed in the gap in the cutting-table. The take-off carriage $c$ consists of a wheeled frame, on both sides of which the lever devices $n$ are arranged, the upper ends of the lazy-tongs having bearing-surfaces $o$ for the bricks. When the stream of clay has been cut into pieces, the take-off carriage $c$ is pushed, with the tongs $n$ extended into the gap in the cutting-table, and the tongs are then drawn together to cause their upper ends to engage and remove the bricks from the cutting-table, (see right-hand half of Fig. 7). The loaded carriage $c$ is then drawn out of the cutting-table and the tongs collapsed, whereby the bricks are separated from one another and may then be removed by means of a loading-frame $h$. The upper arms of the lazy-tongs (illustrated in Fig. 7) are preferably lengthened and are provided with the bearing-surface $o$ for the bricks.

In the form shown in Fig. 8 the bearing-surfaces $o$ are firmly connected with the upper arms of the tongs.

Another modification is illustrated in Fig. 9, which shows a double row of levers S, the central axis $t$ of which is seated in the frame of the conveyer, and the lower ends of these levers are connected by a tension-rod $u$. For the purpose of effecting the removal of the bricks the apparatus is pushed into the position indicated in Fig. 9 under the bricks and the tension-rod $u$ moved outward to the right until the levers S stand vertically, as shown by dotted lines in said Fig. 9. In this form the bearings $o$ for the bricks are simultaneously raised and the bricks are removed from the cutter. After the carriage is run out from the cutter the tension-rod is moved from right to left, whereby the different bricks are lowered and simultaneously separated.

In Fig. 10 is illustrated a device in which the bearing-arms $p$ are single-armed and are connected together by a chain $r$. Removal of the bricks is effected by means of a transverse rod $v$, on which stops $w$ are fixed. The stops are spaced at such a distance that when they are pulled to the left all the arms assume a vertical position.

I claim as my invention—

1. A machine for conveying and separating unburnt bricks, which comprises a conveyer adapted to move adjacent the lower face of a brick-cutting table, and provided with brick-engaging means, and means for varying the height of the brick-engaging means of the conveyer whereby the bricks are individually engaged and removed thereby and separated.

2. The combination of a brick-cutting table, an obliquely-disposed track arranged under said table and a wheeled conveyer movable over said track adjacent to the lower surface of said table and provided with spaced brick-engaging means for engaging the bricks individually and removing them in spaced or separated condition.

3. The combination of a brick-cutting table, an obliquely-disposed track arranged under said table and having spaced depressions near its lower end and a wheeled conveyer movable over said track adjacent to the lower surface of said table and adapted to engage said depressions.

4. A machine for conveying and separating unburnt bricks comprising a vertically-adjustable conveyer adapted to move adjacent the lower face of a brick-cutting table and means for varying height of the bearing-surface of the conveyer whereby the bricks are removed and separated.

In testimony whereof I have affixed my signature in presence of two witnesses.

FRIEDRICH HERRMANN.

Witnesses:
 ERNST KATZ,
 BRUNO HORDING.